(12) United States Patent
Rollinger et al.

(10) Patent No.: US 7,380,447 B2
(45) Date of Patent: Jun. 3, 2008

(54) METHOD AND SYSTEM FOR TRANSIENT AIRFLOW COMPENSATION IN AN INTERNAL COMBUSTION ENGINE

(75) Inventors: John Rollinger, Sterling Heights, MI (US); Paul Pietrzyk, Beverly Hills, MI (US); Karen Willard, Grosse Pointe Farms, MI (US); Michael Cullen, Northville, MI (US); Rob Ciarrocchi, Stockbridge, MI (US); Jeff A. Doering, Canton, MI (US)

(73) Assignee: Ford Global Technologies. LLC, Dearborn, MI (US)

( * ) Notice: Subject to any disclaimer, the term of this patent is extended or adjusted under 35 U.S.C. 154(b) by 0 days.

(21) Appl. No.: 11/423,433

(22) Filed: Jun. 10, 2006

(65) Prior Publication Data

US 2007/0295067 A1 Dec. 27, 2007

(51) Int. Cl.
*G01M 15/00* (2006.01)
(52) U.S. Cl. .................................................. 73/118.2
(58) Field of Classification Search .................. 73/112, 73/115, 116, 117.1, 117.2, 117.3, 118.1, 118.2, 73/119 R
See application file for complete search history.

(56) References Cited

U.S. PATENT DOCUMENTS

| | | | |
|---|---|---|---|
| 5,526,787 A * | 6/1996 | Pallett | 123/399 |
| 5,690,071 A | 11/1997 | Jankovic | |
| 5,889,205 A * | 3/1999 | Treinies et al. | 73/118.2 |
| 6,186,124 B1 | 2/2001 | Stefanopoulou et al. | |
| 6,219,611 B1 | 4/2001 | Russell | |
| 6,488,008 B1 | 12/2002 | Jankovic et al. | |
| 6,588,261 B1 * | 7/2003 | Wild et al. | 73/118.2 |
| 6,701,890 B1 | 3/2004 | Suhre et al. | |
| 6,708,102 B2 | 3/2004 | Jankovic et al. | |
| 6,718,822 B2 * | 4/2004 | Soliman et al. | 73/118.2 |
| 6,789,414 B2 * | 9/2004 | Fuwa | 73/118.2 |
| 6,986,337 B2 * | 1/2006 | Muto | 123/350 |
| 7,275,426 B2 * | 10/2007 | Lahti et al. | 72/118.1 |
| 2005/0235743 A1 * | 10/2005 | Stempnik et al. | 73/116 |

* cited by examiner

*Primary Examiner*—Eric S. McCall

(57) ABSTRACT

A method for determining airflow to a cylinder of an internal combustion engine, such airflow passing to the cylinder through an intake manifold. The method includes providing a model of the intake manifold, such model providing a relationship between expected output airflow from the intake manifold in response to airflow into the intake manifold; determining from the model the expected output airflow from the intake manifold from a previous commanded airflow into the intake manifold; determining a compensation airflow required for the input airflow to the intake manifold to drive the expected output from the intake manifold towards the desired cylinder airflow; and providing such compensation airflow to the intake manifold.

51 Claims, 8 Drawing Sheets

MODEL OF INTAKE DYNAMICS: REPRESENTS ONE OR MORE METHODS OF MANIFOLD FILLING MODELS (WITH/WITHOUT EFFECTS FOR COMPRESSORS OR COOLERS)
COMPENSATION FOR LAG: REPRESENTS AN INVERSE MANIFOLD FILLING MODEL OR METHOD TO ACCOUNT FOR FLOW REQUIRED TO COMPENSATE FOR MANIFOLD FILLING
COMPENSATION FOR DISTURBANCES: REPRESENTS DIFFERENTIATED IDEAL GAS LAW APPLIED ACROSS SOME/ALL OF THE MANIFOLD OUTLET FLOW CONTROL DEVICES WHICH CAN AFFECT VOLUMETRIC EFFICIENCY

PRESENT INVENTION

PRESENT INVENTION

PRESENT INVENTION

PRESENT INVENTION

PRESENT INVENTION

PRESENT INVENTION

PRESENT INVENTION

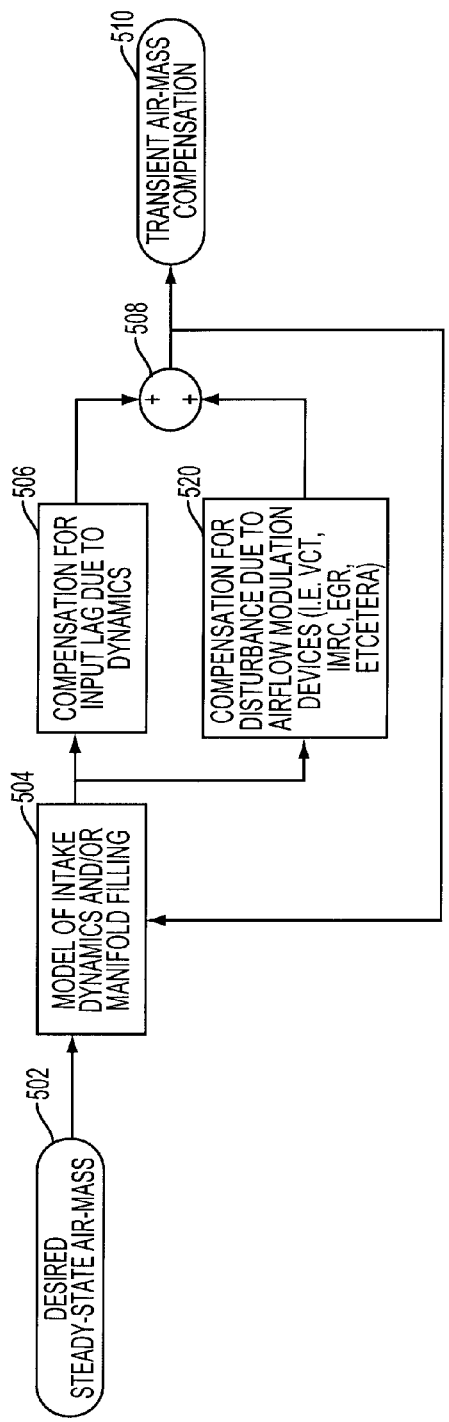

FIG. 5

MODEL OF INTAKE DYNAMICS: REPRESENTS ONE OR MORE METHODS OF MANIFOLD FILLING MODELS (WITH/WITHOUT EFFECTS FOR COMPRESSORS OR COOLERS)
COMPENSATION FOR LAG: REPRESENTS AN INVERSE MANIFOLD FILLING MODEL OR METHOD TO ACCOUNT FOR FLOW REQUIRED TO COMPENSATE FOR MANIFOLD FILLING
COMPENSATION FOR DISTURBANCES: REPRESENTS DIFFERENTIATED IDEAL GAS LAW APPLIED ACROSS SOME/ALL OF THE MANIFOLD OUTLET FLOW CONTROL DEVICES WHICH CAN AFFECT VOLUMETRIC EFFICIENCY

METHOD AND SYSTEM FOR TRANSIENT AIRFLOW COMPENSATION IN AN INTERNAL COMBUSTION ENGINE

TECHNICAL FIELD

This invention relates generally to methods and systems for transient airflow compensation in an internal combustion engine and more particularly to transient airflow compensation using Electronic Throttle Control (ETC).

BACKGROUND

As is known in the art, Electronic Throttle Control (ETC) offers many benefits in delivering an accurate airflow requested by the driver via accelerator pedal interaction. Matching the driver requested airflow during both steady-state and transient operation helps to give the driver a sense of a direct connection with the vehicle.

More particularly, when there is a disturbance in the system to affect airflow or a transient desiring more airflow, normally, one opens the throttle to the appropriate setting and then has to wait a few cycles for the manifold to fill up. This produces an undesirable delay to the driver. A technique for reducing the delay due to manifold filling is discussed in U.S. Pat. No. 6,219,611. In this patent it is described to move outlet flow control devices, such as variable cam position mechanisms, in order to achieve a quicker manifold filling response to a step change in throttle area or angle at the inlet to the manifold. While this method is effective at decreasing manifold filling delays, it can have the potential to degrade fuel economy and emissions by placing outlet control devices, such as variable cam timing mechanisms, in transient positions.

Now that there are electronically controlled throttles, what can be done is to swing the throttle valve open farther than the steady state position and to load the system with air. Then, the throttle valve reverts back to where it needs to be to satisfy driver demand once the manifold filling transient condition is completed. A method to do this in relation to a variable cam timing (VCT) transition is discussed in U.S. Pat. No. 5,690,071. This patent describes a mechanism for cancelling out disturbances in manifold outlet flow by means of the electronic throttle, however it requires a relatively high computational load on the powertrain control module (PCM) or engine control unit (ECU).

As is also known in the art, many ETC systems employ a control method called "Pedal Follower", in which a pedal movement directly translates to a requested throttle position. This method allows for a square-edged response in throttle position for a square edged input to the pedal. Another major ETC system is known as "Torque Based", in which a pedal movement is translated to a desired torque (either indicated torque or brake torque at a potential variety of points in the powertrain: engine flywheel, transmission output shaft, or at the wheels). The end result is a desired cylinder airflow, which is then scheduled via the throttle. Many existing systems directly schedule the throttle to achieve the steady-state cylinder flow that is desired. This provides for stable scheduling, but sacrifices transient response, as manifold filling lag occurs between the time that the throttle is placed in the steady-state flow position and the time when the steady-state flow is achieved.

One known method for compensating for transient inaccuracy is to use closed-loop feedback on a sensor which gives information as to the state of the manifold, such as a mass air-flow sensor or manifold absolute pressure sensor. This method certainly can give very reasonable delivery of the desired cylinder flow during transient airflow requests; however, in the closed loop compensation method the fact that closed-loop control method uses feedback will always have a delay in air-mass matching. Also, sensors used in the feedback control can experience drift, noise, and failure which can cause undesirable throttle control under these conditions.

SUMMARY

In accordance with the present invention, a method is provided for determining airflow to a cylinder of an internal combustion engine, such airflow passing to the cylinder through an intake manifold. The method includes providing a model of the intake manifold, such model providing a relationship between expected output airflow from the intake manifold in response to airflow into the intake manifold; determining from the model the expected output airflow from the intake manifold for a previous commanded airflow into the intake manifold; determining a compensation airflow required for the input airflow into the intake manifold to drive the expected airflow output from the manifold towards the desired cylinder airflow; and providing such compensation airflow to the intake manifold.

The model-based control method is based on intake manifold dynamics, which uses no direct primary sensor feedback, and is capable of delivering accurate cylinder airflow which matches the desired cylinder airflow.

The method compensates for both devices which modify cylinder flow via variation in volumetric efficiency and in a broader sense cancels out manifold filling delay in total via a lead compensation scheme. The method takes advantage of the full range of authority of the throttle, or other intake flow control devices, and can overdrive up to wide open throttle and under-drive down to closed-in-bore flows (throttle fully closed with the flow constituting the leakage past the throttle plate in the throttle body bore). The result is good transient delivery of airflow with little or no manifold filling delay under all engine operating conditions.

With such invention, a model-based control method based on intake manifold dynamics, which uses no direct sensor feedback, is capable of delivering accurate cylinder airflow which matches the desired cylinder airflow.

Furthermore, since a model of the intake manifold can be made which accurately models the dynamics, and only varies with physical constants from engine family to engine family, the following benefits are achieved:

Full feed-forward compensation allows for better cancellation of volumetric disturbances and faster matching capability of transient airflow request changes.

Model-based control allows for transient compensation without the usage of sensor feedback. This allows for more reliable control with virtual immunity to component degradation.

Model design which uses software models which are already needed to control throttle positioning and estimate manifold pressure allow for re-use of existing calibration and state estimation.

General compensation for devices which modify volumetric efficiency using a simple and effective formula which allows for efficient calculation of a compensation term.

State estimators for throttle position, predicted throttle flow, predicted cylinder flow, and predicted manifold pressure all provide information that can be used for other control actions and strategies that would desire knowledge of these values without the downsides of reading sensor inputs which can experience noise and failures.

Additionally, with such method, cylinder flow disturbance cancellations for other manifold outlet flow devices (Runner-Length Control, Tuning or Swirl Control valves, rapid engine speed changes, etc.) are achievable. Further, the method uses the inlet flow control devices (e.g., Electronic Throttle) to overcome manifold filling delays.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is an overview flowchart of the method according to the present invention.

Like reference symbols in the various drawings indicate like elements.

DETAILED DESCRIPTION

Figure 1:
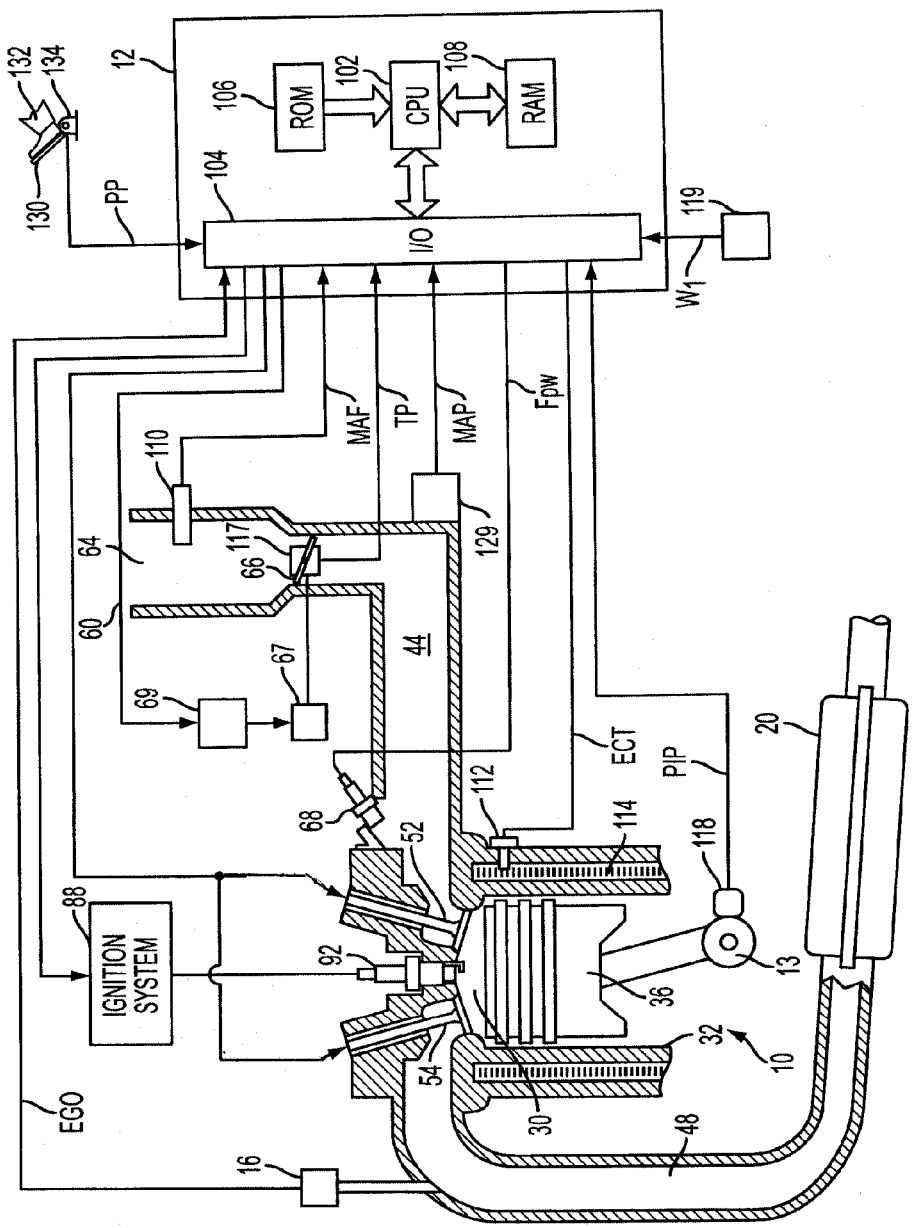
FIG. 1 is a diagram of a single cylinder, of a multi-cylinder airflow path, on an internal combustion engine.

Referring to FIG. 1, internal combustion engine 10 is shown. Engine 10 is an engine of a passenger vehicle or truck driven on roads by drivers. Engine 10 can be coupled to a torque converter via crankshaft 13. The torque converter can also be coupled to transmission via a turbine shaft. The torque converter has a bypass clutch which can be engaged, disengaged, or partially engaged. When the clutch is either disengaged or partially engaged, the torque converter is said to be in an unlocked state. The turbine shaft is also known as transmission input shaft. The transmission comprises an electronically controlled transmission with a plurality of selectable discrete gear ratios. The transmission also comprises various other gears such as, for example, a final drive ratio. The transmission can also be coupled to tires via an axle. The tires interface the vehicle to the road.

Internal combustion engine 10 comprising a plurality of cylinders, one cylinder of which, shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In one example, converter 20 is a three-way catalyst for converting emissions during operation about stoichiometry.

Intake manifold 44 communicates with throttle body 64 via throttle plate 66. Throttle plate 66 is controlled by electric motor 67, which receives a signal from ETC driver 69. ETC driver 69 receives control signal on line 60 from controller 12. In an alternative embodiment, no throttle is utilized and airflow is controlled solely using valves 52 and 54. Further, when throttle 66 is included, it can be used to reduce airflow if valves 52 or 54 become degraded, or to create vacuum to draw in recycled exhaust gas (EGR), or fuel vapors from a fuel vapor storage system having a valve controlling the amount of fuel vapors.

Intake manifold 44 is also shown having fuel injector 68 coupled thereto for delivering fuel in proportion to the pulse width of signal (fpw) from controller 12. In an alternative embodiment, fuel injector 68 can be coupled directly to the combustion chamber 30, which performs direct fuel injection into the combustion chamber. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass airflow (MAF) from mass airflow sensor 110 coupled to throttle body 64; engine coolant temperature (ECT) from temperature sensor 112 coupled to cooling jacket 114; a measurement of manifold pressure from MAP sensor 129, a measurement of throttle position (TP) from throttle position sensor 117 coupled to throttle plate 66; a measurement of torque converter turbine speed (Wt) from turbine speed sensor 119, and a profile ignition pickup signal (PIP) from Hall effect sensor 118 coupled to crankshaft 13 indicating an engine speed (N). Alternatively, turbine speed may be determined from vehicle speed and gear ratio. Alternatively, engine coolant temperature may be determined from cylinder head temperature or an indication of ambient temperature and cylinder combustion information from engine speed and cylinder airflow from the mass airflow sensor.

Continuing with FIG. 1, accelerator pedal 130 is shown communicating with the driver's foot 132. Accelerator pedal position (PP) is measured by pedal position sensor 134 and sent to controller 12.

Figure 2:
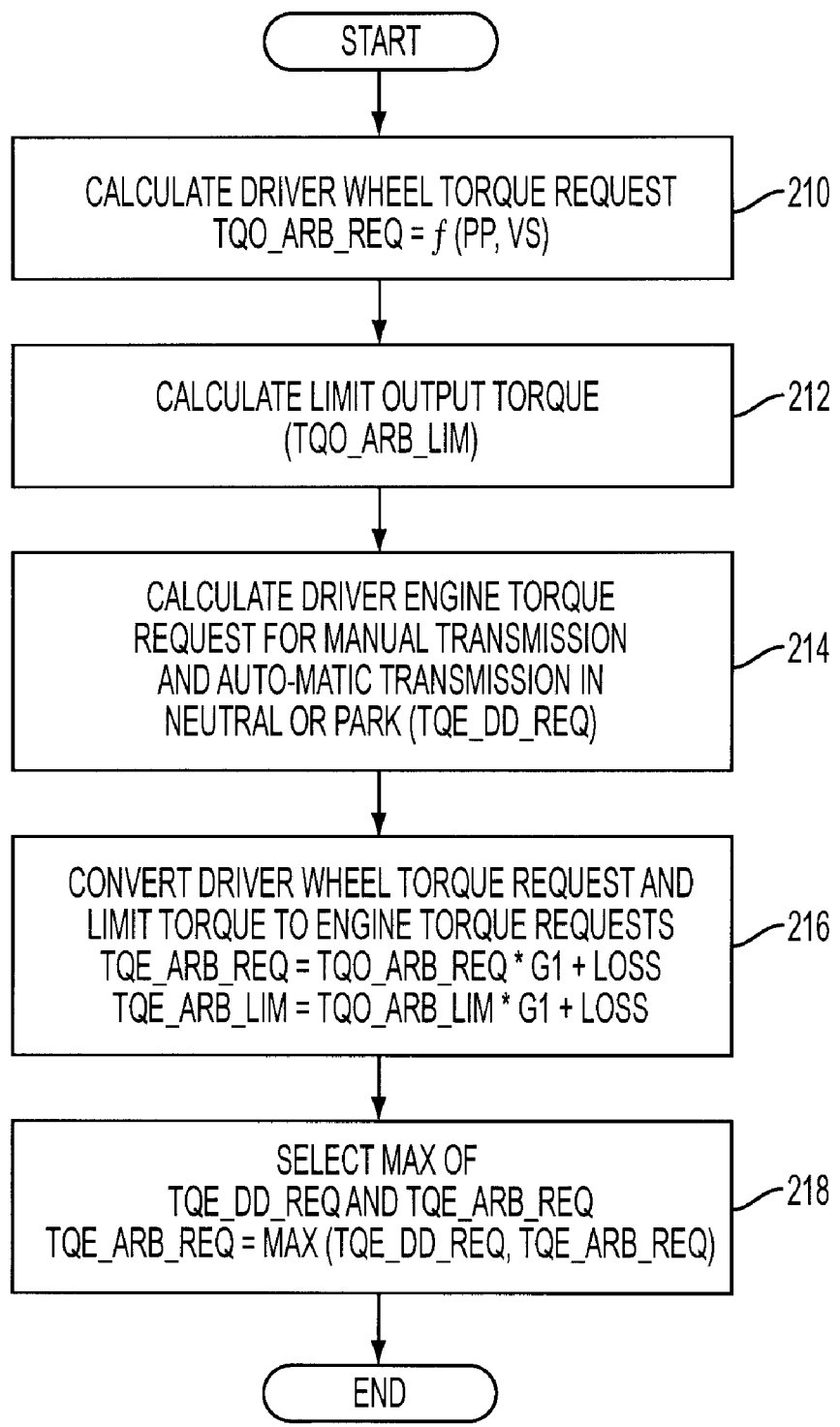
FIG. 2 is a flowchart representation of one embodiment of a method to determine a driver demanded torque in a torque based Electronic Throttle Control system.

Referring now to FIG. 2, a routine is described for determining the desired engine torque for use in the engine control system. First, in step 210, a driver requested wheel torque, or output shaft torque, is calculated based on pedal position and vehicle speed. In particular, the driver requested torque (tqo_arb_req) is calculated as a two-dimensional lookup table as a function of pedal position (PP) and vehicle speed (vspd). Next, in step 212, a limit torque (tqo_arb_lim) is determined. This limit output torque can be provided from various sources, for example, from vehicle speed limiting, traction control limiting, or from a vehicle stability control system. When the transmission controller provides the limit output torque, this torque can represent maximum allowable torque that can be transmitted through the transmission. Next, in step 214, the routine calculates a driver engine torque request for manual transmissions and automatic transmissions in neutral, park, or some driver selected gears (tqe_dd_req). Note that the tqe_dd_req is a separate parameter than the one calculated in step 210, when tqe_arb_req is calculated for automatic transmissions when the transmission is in a gear other then neutral or park. Next, in step 216, the routine converts driver wheel torque request and limit torque to engine torque request using overall ratio G1 (which includes gear ratio, torque converter torque ratio, transmission efficiency), and torque loss parameter, LOSS, which preferably represent friction. Next, in step 218, the routine selects the maximum of the tqe_dd_req and tqe_arb_req. In this way, the routine arbitrates the proper engine torque request taking into account whether an automatic transmission or manual transmission is present in the vehicle. Further, the routine provides for automatic transmissions operated in a mode, such as neutral or park, when the engine is not coupled to drive the wheels. In an alternative embodiment, the torque value determined as being directly requested by the driver in step 210 can be a brake engine torque which can be determined via a table lookup based on pedal position or pedal position and engine speed.

Having determined the requested torque, the processor determines the required cylinder airflow (i.e., the desired steady-state air-mass through the intake manifold) to achieve the requested torque. The engine brake torque request arbitrated in step 218 can then be converted to an indicated engine torque request by adding in losses due to engine pumping efficiency and engine accessory drive torque. The pumping efficiency can be determined primarily as a function of engine speed and manifold absolute pressure, where the function can be a lookup table in memory or a regression of sufficient order. The accessory drive torque for each accessory drive component can be characterized by command and feedback information regarding each accessory, and can utilize ECU stored lookup tables or models of the accessory device which outputs a loss estimate based on said information. This desired indicated engine torque is assumed to be at stoichiometric air/fuel ratio, minimum for best torque (MBT) spark, and all cylinders activated. A correction can be made to this indicated torque request to compensate it for being at an operating condition in which spark may not be at MBT timing, air/fuel ratio may not be at stoichiometry, and all or some of the cylinders may be deactivated. After the final desired indicated engine torque is found, a model of the relationship between the indicated engine torque, engine speed, and cylinder airflow can be used. In one embodiment a lookup function with inputs of indicated engine torque and engine speed is used to output either a normalized cylinder charge flow (Load) or a raw cylinder air charge flow. The charge flow can then be converted to a flow in terms of time rather than cylinder events with a unit conversion using information of engine speed and number of cylinders present in the engine. Additionally adders to the requested cylinder flow, or earlier in the engine brake torque domain, can be made to compensate for accessory loading or engagements (such as air conditioning, alternators, power steering pumps, transmission engagements, etc.)

Figure 3A:
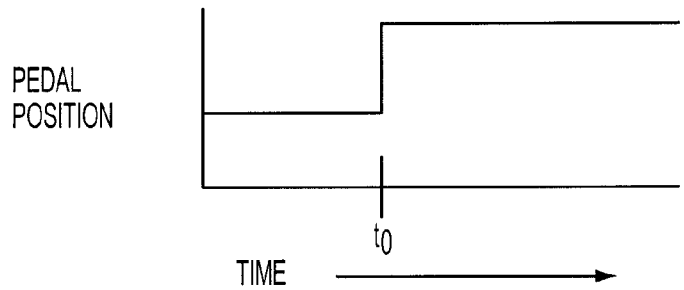
FIGS. 3A-3E is a set of timing diagrams of a process used in accordance with the PRIOR ART with non-overdriven throttle flow.
Figure 3B:
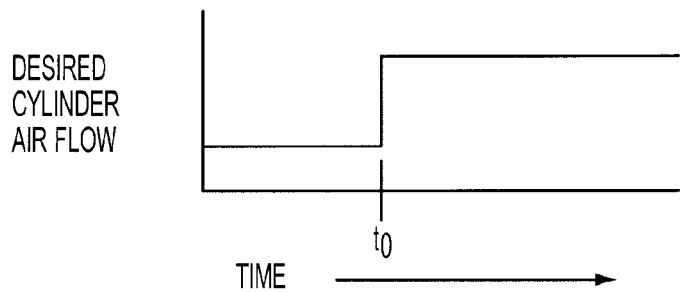
Figure 3C:
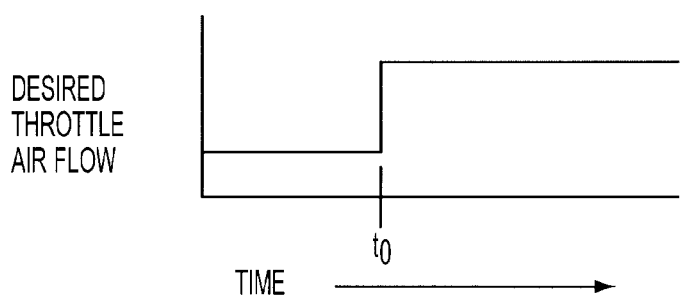
Figure 3D:
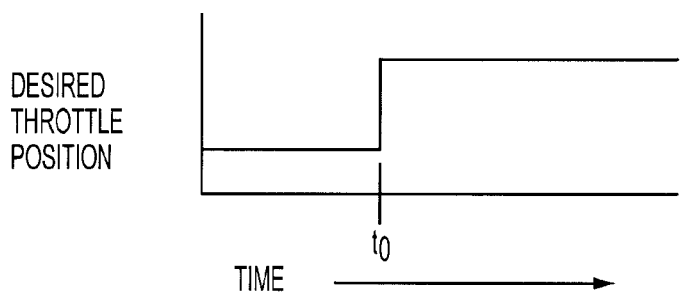
Figure 3E:
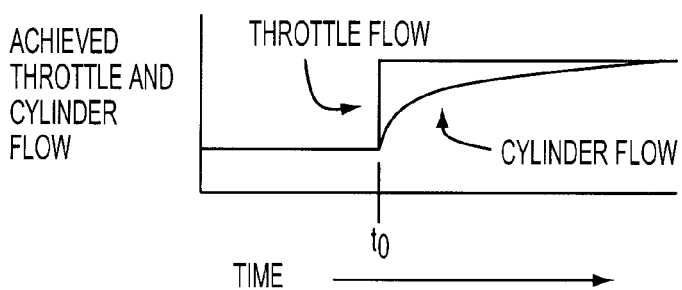

Referring now to FIG. 3, as will be described in more detail below, the invention uses a model-based control method based on intake manifold dynamics, which uses no direct sensor feedback, and is capable of delivering accurate cylinder airflow which matches the desired cylinder airflow. This method takes advantage of the full range of authority of the throttle and can overdrive up to wide-open throttle and under-drive down to closed in bore. The result is good transient delivery of airflow with little or no manifold filling delay. This method compensates for both devices which modify cylinder flow via variation in volumetric efficiency and in a broader sense cancel out manifold filling delay in total as shown in FIG. 4 and FIG. 5. Thus, as shown in FIG. 3F through 3L, a compensated airflow request based on a predicted airflow is used to command a modified throttle flow thereby producing the driver-desired airflow.

The conventional prior art methods, be they pedal follower or torque based, would produce at most a square-edged throttle request or throttle flow, and thus mis-deliver the desired cylinder flow during transient conditions due to the delay of filling the intake manifold with air mass. FIG. 3A shows a prior art system where the driver performs a step change in pedal position at time $t_0$, which in this example produces a step change in demanded cylinder flow in response as shown in FIG. 3B. The system then in FIG. 3C passes the desired cylinder flow request directly to the throttle flow request without transient compensation. This results in a step change in throttle position in FIG. 3D. The result in FIG. 3E is that throttle flow ends up following the driver request instead of the cylinder flow, which increases slowly due to physical filtering due to natural manifold filling dynamics.

Figure 3F:
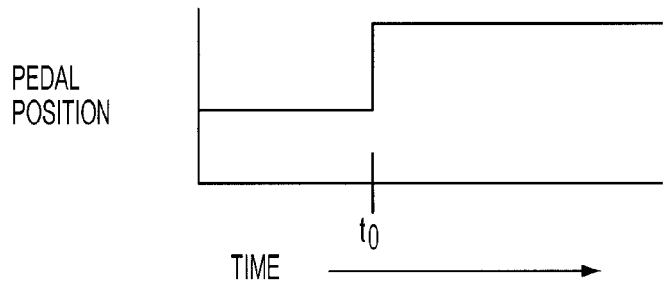
FIGS. 3F-3L is a set of timing diagrams of a process used in accordance with the invention showing the over-driven commanded throttle flow needed achieve the desired cylinder.
Figure 3G:
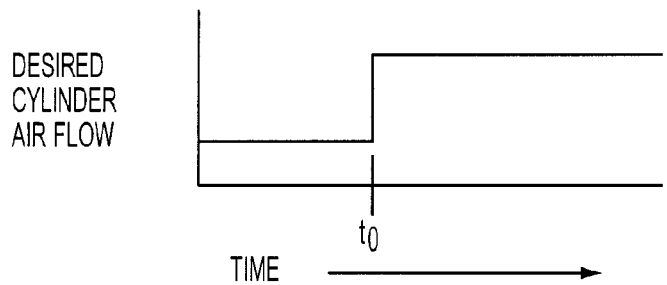
Figure 3H:
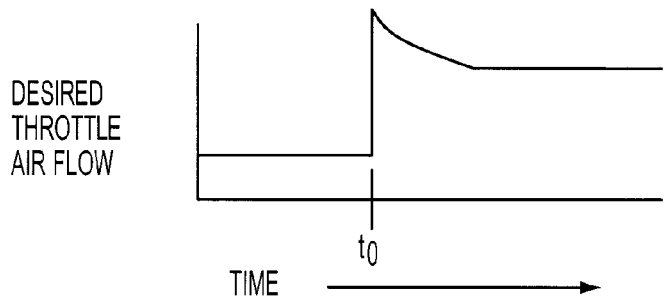
Figure 3I:
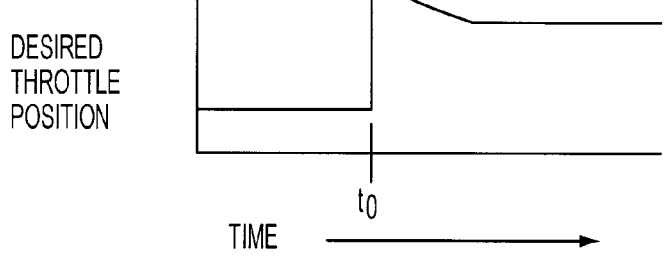
Figure 3J:
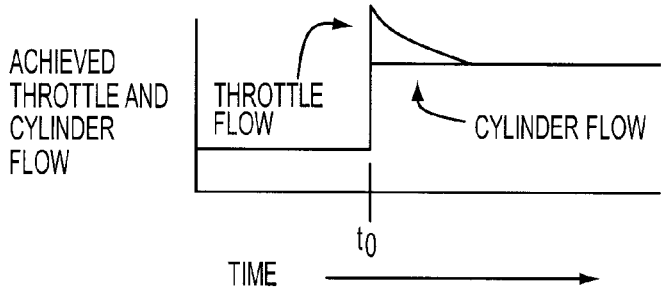
Figure 4:
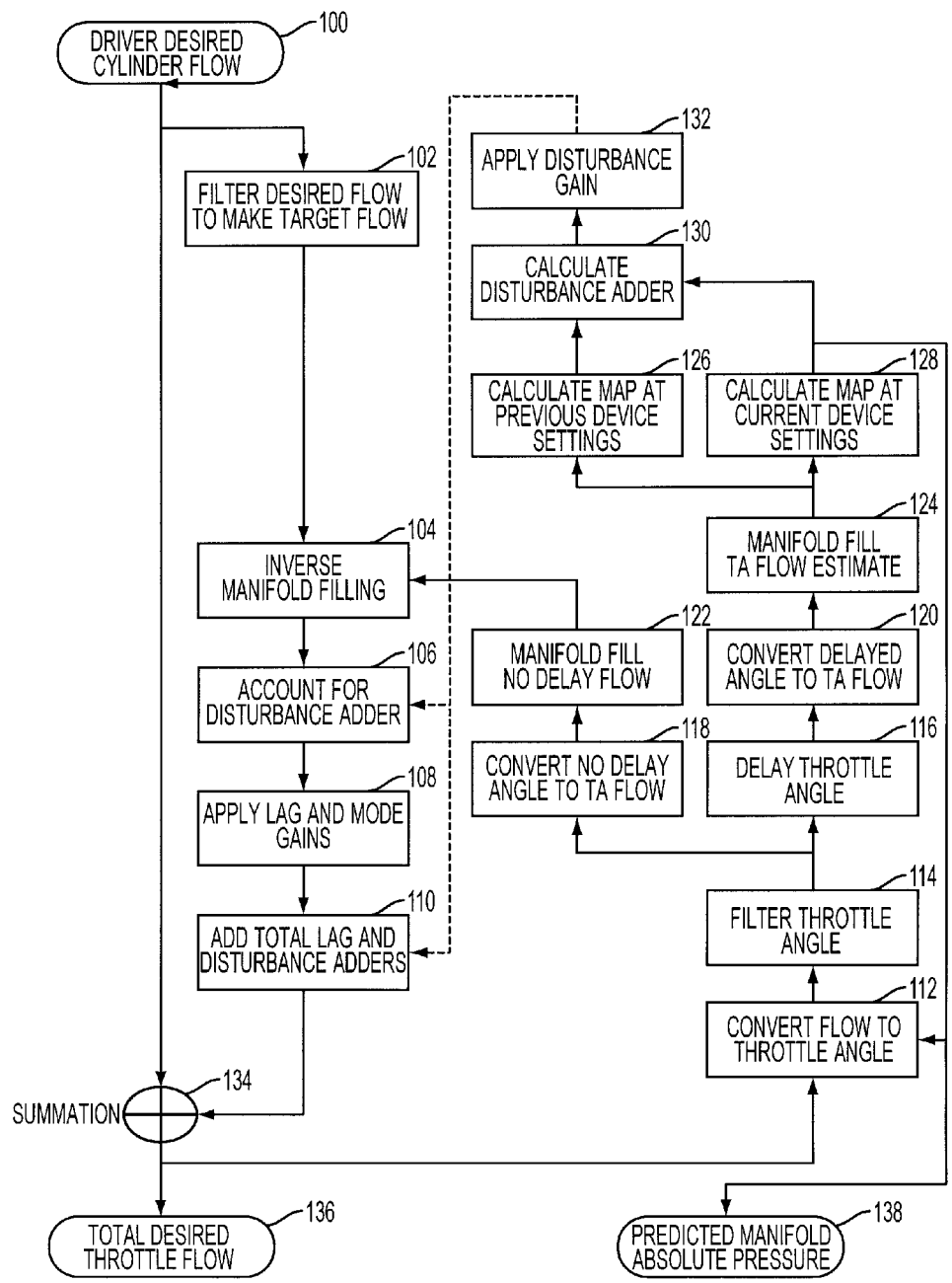
FIG. 4 is a detailed flowchart of an embodiment of the present invention.

The present invention on the other hand, when exposed to the same driver stimuli at to as shown in FIGS. 3F and FIG. 3G, performs an algorithm described later to determine a different throttle flow request in FIG. 3H. This throttle flow request in FIG. 3H results in a corresponding throttle position request in FIG. 3I. The resultant throttle flow achieved in FIG. 3J now matches the requested throttle flow in FIG. 3H and most notably the achieved cylinder flow in FIG. 3H now matches the requested cylinder flow in FIG. 3G.

Figure 3K:
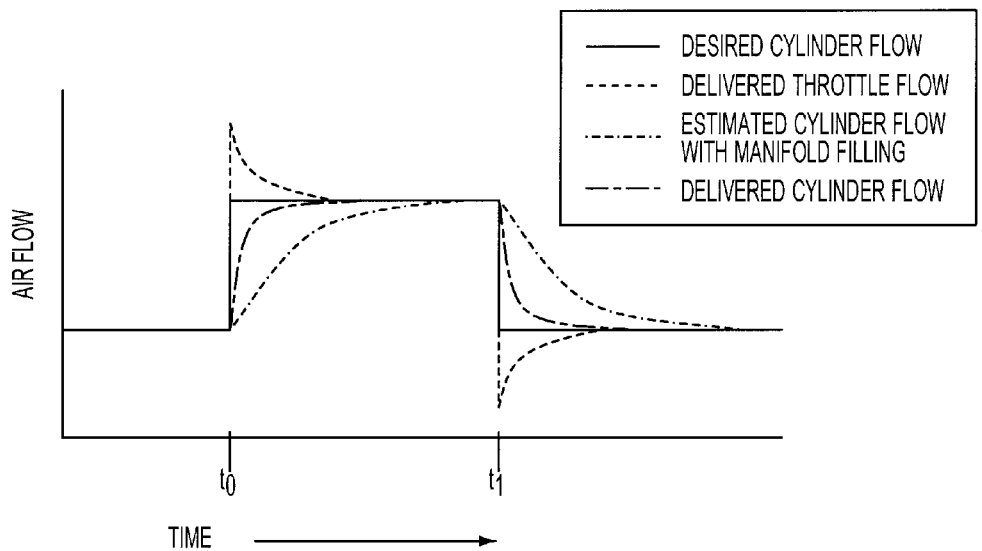
Figure 3L:
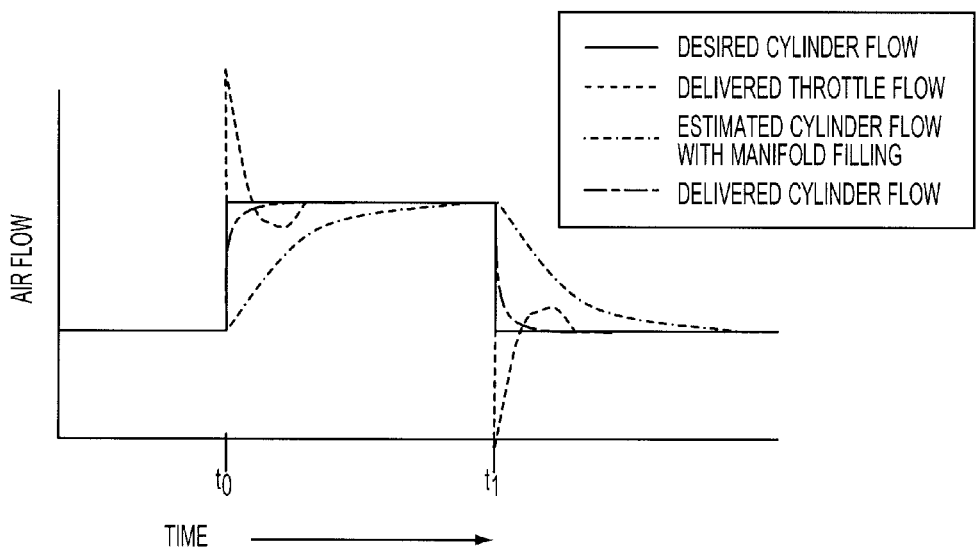

To further illustrate this invention, FIG. 3K shows the relationship between the desired cylinder flow, delivered throttle flow, estimated cylinder flow with manifold filling, and delivered cylinder flow. It should be noted that this shows the compensation is applicable to both increasing requests in cylinder airflow as well decreasing requests. At time $t_0$, the desired cylinder flow takes an increasing step. The throttle flow is commanded to be higher than the steady-state throttle flow for a brief period of time. The estimated cylinder flow with manifold filling shows what the cylinder flow response would have been if throttle flow had not been briefly increased above the steady-state level. The delivered cylinder flow shows that it very closely followed the desired cylinder flow. The difference between the estimated cylinder flow with manifold filling and the delivered cylinder flow represents the improvement delivered via practicing the invention disclosed within. At time $t_1$, the desired cylinder flow is decreased in a step. As with the response of the system at time $t_0$, the throttle flow is commanded beyond the steady-state value, but in this case it is driven to a lower flow than steady-state for a brief period of time. It is also shown in FIG. 3L that the compensation term need not be a single over-driving of throttle flow in order to work. In the example shown in FIG. 3L, the throttle flow is driven beyond the throttle flow shown in FIG. 3K for a smaller amount of time. The throttle flow in FIG. 3L is then driven back the other direction from steady-state as its initial command. Such a behavior is possible to allow for even faster changes in cylinder flow, where the throttle rapidly begins filling the manifold, and a request to quickly decrease throttle flow can be used to prevent overshoots in delivering the desired cylinder flow. It should be noted that again a single over-shoot and a single under-shoot is shown in FIG. 3L, but any number of overshoots and under-shoots is possible in controlling the airflow into the cylinder.

As described in U.S. Pat. No. 5,331,936, entitled "Method and apparatus for inferring the actual air charge in an internal combustion engine during transient conditions intake manifold air filling" issued Jul. 16, 1994, inventors Isis A Messih, Lawrence H. Buch, and Michael J. Cullen, assigned to the same assignees as the present invention, the entire subject matter being incorporated herein by reference, manifold filing may be expressed as first order filter on throttle flow into an intake manifold, with a modifier to the filter based on a change in the effective rate of filtering. The filter constant in this method is based on a per cylinder event basis, where the filter constant represents the percentage amount of fresh air from the throttle flow into the intake manifold which is included in the cylinder flow on the next cylinder intake event. This method calculates a filter constant based on stored volumetric efficiency information which is utilized in the production of an inferred manifold absolute pressure value. The major portions of this inferred manifold absolute pressure algorithm are described within the above referenced U.S. Pat. No. 6,115,664 assigned to the same assignees as the present invention, the entire subject matter being incorporated herein by reference.

Manifold Pressure may be expressed in one embodiment as follows:

An offset, slope, and quadratic term are found for the state where volumetric efficiency changing devices is in a closed position. Examples of volumetric efficiency changing devices include: intake runner switch valve for changing runner length, swirl control valve, intake tuning valve a variable cam, which can be either intake, exhaust, or both, a variable valve timing mechanism, which can be either intake, exhaust, or both, intake tuning valve, internal dilution mechanism or external exhaust gas recirculation directly into the intake runners or ports, from an exhaust device, such as a variable geometry turbocharger, where the exhaust back pressure changes rapidly with the device, or where the device state change is augmented with a change in estimated cylinder charge flow in the calculation of the partial derivative of manifold pressure. These terms are a function of engine speed, cam position (intake, exhaust, or some normalized value of either or both combined). The information is regressed empirical data relating the amount of cylinder flow to a manifold pressure and is looked up from tables stored within the ECU. This information is a surrogate for volumetric efficiency, and contains the same general information content.

Additionally an offset slope, and quadratic term is found for the opposite (or open) state of a runner control switch valve. The information is also regressed empirical data and is looked up from tables stored within the ECU.

A final offset, slope, and quadratic coefficient is found based on weighted averaging the offsets, slopes, and quadratic terms found for each of the volumetric efficiency devices, e.g., for each of a pair of two runner control switch valve states on the present state of the runner control valve position. Additionally the offset on inferred manifold pressure is additionally corrected as a function of barometric pressure.

A correction to the airflow into the cylinder for the effective percentage contribution of EGR flow on manifold pressure is made. Additionally, the cylinder flow used to calculate inferred manifold pressure is also compensated by a looked up compensation amount that is a function of air charge temperature, engine coolant or head temperature, and barometric pressure. This compensation term represents the difference in volumetric efficiency due to a change in air density from standard temperature and pressure, at which the regression is mapped. In this example inferred manifold absolute pressure value is derived as a $2^{nd}$ order orthogonal polynomial.

This example is one embodiment of calculating an inferred manifold pressure. The method of the invention described within for compensating transient airflow control is not specific to this approach.

An alternative embodiment without an orthogonal regression can be simply shown as:

Inferred MAP=Offset(N,CAM,IMRC)*F(BP)+Slope
(N,CAM,IMRC)*F(ACT,CHT,Vol)*F(EGR)*Air
Charge+Quadratic(N,CAM,IMRC)*F(ACT,CHT,
Man Vol)*F(EGR)*(Air Charge*Air Charge)

For the practice of the transient flow compensation algorithm described herein, it is only necessary to have a method of calculating an inferred manifold pressure as a function of devices such as shown in the form below. This function can be any combination of empirical or physics based calculations based on any combination of inputs as shown below.

Inferred MAP=F(Engine Speed, Cam Position, Intake Runner Switch Position or Swirl Valve Position, Barometric Pressure, Exhaust Gas Recirculation Flow, Air Charge Temperature, Engine Coolant or Cylinder Head Temperature, Manifold Volume, Air Charge Cylinder Flow, Variable Displacement Cylinder Devices, Exhaust Back Pressure, etcetera)

The example embodiment of a manifold filling model is shown below. It is based on much of the same stored volumetric efficiency data as used in the example embodiment of inferred manifold pressure shown above. In the example embodiment of inferred manifold pressure, the final fresh air coefficients (offset, slope, and quadratic coefficients of the regression) were calculated.

A denominator term for the manifold filling filter constant can be found by summing the slope term with the offset term divided by the current cylinder air charge flow, and quadratic term multiplied by the equivalent cylinder air charge flow (shown here in an orthogonal form). The result is a filter constant denominator in effective units of pressure per flow mass flow per cylinder event.

air_k_denom=slope+(offset/charge air flow)+quadratic*(charge air flow−maxairchg+
(maxairchg*maxairchg/(6.0F*charge air flow))

The actual filter constant has a numerator which is a function of manifold air temperature (which can be approximated as a function of air intake temperature and engine coolant or head temperature) and the manifold volume. This value is converted to the proper set of units and represents an effective portion of the Ideal Gas Law, Ideal Gas Constant multiplied by Temperature divided by Volume [(R*T)/V]. By dividing this value by the denominator (which represents pressure per charge flow), you get a filter constant in effective units of change per cylinder event.

air_fk=(air_num_mult/air_k_denom);

The actual manifold filling model is based on a discrete first order filter. Whereby the filter constant is applied to the flow entering the manifold and a value of (1 minus the filter constant) is applied to the previous estimate of flow out of the manifold into a cylinder. Additionally a term is applied to the previous cylinder flow estimate (filter constant divided by the previous filter constant) to account for filling effects due to a change in volumetric efficiency between the two discrete calculations.

charge air flow last=charge air flow air_fk_1st=air_fk charge air flow=(air_*fk*/air_*fk*_last)*((1−air*fk*)
*charge air flow last)+(air_*fk**manifold inlet air flow)

The example embodiment of manifold filling displayed above is shown as strictly a function of the equation above. However in practice manifold filling models can be made through several methods, all which are sufficient for practicing the invention described herein for transient airflow compensation.

Another such embodiment could be of a similar form as above, but storing a either a continuous time constant, which can be converted to a discrete filter constant through a relationship such as filter constant equals the discrete evaluation interval time divided the sum of the discrete evaluation interval time plus the time constant. Additionally a discrete filter constant could be stored directly into computer data storage in an ECU as a function of a variety of combinations of various inputs. An example of this is shown below.

FK=F(air charge, map, mapped volumetric efficiency as a function of engine speed, cam position, et cetera . . . )

New Air Charge at Cylinder=(1−*FK*)*(*FK/FK*_last)
*Last Air Charge at Cylinder+(*FK*)*New Air Charge at throttle calculates a pair of compensators (i.e., one for manifold filling delay and one which is the effect on cylinder flow due to a change in volumetric efficiency) which symbiotically work to cancel out both the lag due to manifold filling and the increase/decrease in cylinder flow due to change in state of airflow modifying devices. In Step 502, the desired cylinder airflow is request. This is comparable to the signal in either FIG. 3B or FIG. 3G, or to Step 100 in FIG. 4, to be described. In Step 504, this cylinder flow request is combined with information about the compensation used in the last pass of the process, Step 504. Step 504 then uses this information to calculate a predicted or estimated cylinder flow. In Step 506, this estimated cylinder flow, which uses this information along with the information of Step 502 an amount of airflow needed to be added or subtracted from the value in block 502 in order to cancel out the manifold filling effects as modeled in Step 504 is calculated. In Step 520, using an estimated cylinder flow value from Step 504, along with information on cylinder flow changing devices (cam timing, runner control position, etc.) a calculation is made to output an adder or subtractor as to the amount of the requested throttle flow needed to compensate for a change in volumetric efficiency. The compensator values from Steps 506 and 520 are given appropriate numerical sign and summed together in Step 508. The purpose of this is to get a symbiotic compensation amount. For example on a system where cylinder flow is requested to increase and the intake valve timing is advancing (moving earlier in reference to Top Dead Center on a cylinder intake stroke), the advancing intake cam would normally add an unwanted increase in cylinder flow for a brief period of time, which Step 520 would want to cancel out. However, since a requested increase in cylinder flow is being requested, the amount needed to be compensated for in Step 506 would actually be less due to the advancing intake cam. Thus, from Step 508 the state of both compensations is known and thus Step 508 schedules the total compensation such that additive effects are taken into account. Step 510 then outputs a final compensation term, which would be an adder or subtractor, to the original cylinder flow request in Step 502. This total amount is then scheduled together at the throttle flow domain, Step 510.

Thus, a method is described for determining airflow to a cylinder of an internal combustion engine, such airflow passing to the cylinder through an intake manifold, comprising: providing a model of the intake manifold, such model providing a relationship between expected output airflow from the intake manifold in response to airflow into the intake manifold, Step 504; determining from the model the expected output airflow from the intake manifold for a previous commanded airflow into the intake manifold, Step 506; determining a compensation airflow required for the input airflow to the intake manifold to drive the expected output airflow from the intake manifold towards a desired cylinder airflow, Step 510. The compensation airflow is then provided to the intake manifold.

An example embodiment demonstrating a preferred method of implementing the present invention is described as follows, and is described in a flow diagram in FIG. 4. In Step 100, the desired cylinder airflow is input into the system. This airflow request in Step 100 is comparable to Step 502 in FIG. 5 and the airflow in FIG. 3B or 3G. In step 102, a filter can be applied to the request to soften the requested change in airflow so that the compensated airflow cannot change in a single step change. The reason for doing this is that a driver may not be expecting or capable of dealing with such a fast change in cylinder flow and the resulting torque change. Also a step change may adversely impact air fuel ratio if the fuel control system cannot deal with very rapid airflow changes. In addition Step 102 may be practiced as a rate limit instead of a filter. It should also be noted that step 102 is a parallel step to Steps 134 and 136. Thus, value from Step 100 is also passed on directly from Steps 100 to 134 without filtering at all times.

In Step 104, the actual compensation for manifold filling takes place. One method for compensating for the manifold filling effect is through an inverse manifold filling model. This model is the inversion of the manifold filling equation given earlier in this document. It is in the form: throttle flow compensation adder=[(1−FK)/(FK)]*Target Cylinder Flow− [(1−FK)/(FKlast)]*Prediction of Cylinder flow without throttle delay. Where Target Cylinder flow is the value received from Step 102 and Prediction of Cylinder flow without throttle delay is the value received from Step 122. The resulting airflow adder represents the total amount of additional air needed to over-drive or under-drive the throttle to achieve the target cylinder flow. Other methods exist for calculating this compensation term and will be discussed later.

In Step 106, a symbiotic merger of a manifold filling lag compensator and a manifold outlet device compensator is created as mentioned earlier in this document, as an example of why the properly signed sum of the compensators from Steps 104 and 132 would be advantageous. For example on an increase in requested cylinder flow which accompanies an advancing intake cam timing, the compensator from Step 132 would naturally want to subtract airflow in order to remove the momentary airflow spike due to a rapidly advancing intake cam. At the same time however the manifold filling compensator in Step 104 would want an increase in manifold outlet flow into an in taking cylinder, and thus would need to provide less compensation if the compensator in Step 132 applies less airflow to be subtracted from the throttle flow request. It should also be noted that under certain practices of Step 104, Step 106 may be redundant if the calculation method used in Step 104 also accounts for manifold outlet device changes.

In Step 108, several gains are available to allow for smoother and selectable operation in a variety of conditions. One gain applied to the lag adder is used to allow for a dead-band and reduced gain at lower airflow errors (defined as target cylinder flow from Step 102—predicted cylinder flow based on no throttle delay from Step 122). The gain is a multiplier, which varies as a function of airflow error and target cylinder flow. Additionally this lag error gain can be a function of the direction of the target cylinder flow (filling or un-filling manifold target flows) and can also vary by mode (such as one for off-idle and one for idle operation).

A second gain can strictly be a function of the operating mode that is present and is a multiplier. These modes can have precedence order, and can exist in a form more or less than given by example below. A multiplier for each mode can be stored in memory and applied. One mode could be for managed tip-in or tip-out transitions in order to reduce tactile or audible clunk. Another mode could be for a cylinder deactivation or variable displacement mode. Another mode could be for each of various closed pedal conditions such as dash-pot or deceleration, target engine speed control, and idle. Another mode could be for each of torque reduction conditions such as vehicle speed limiting, engine speed limiting, torque truncation, traction control, or other various types. Another mode could be for launch conditions where vehicle speed is within a low speed hysteresis band and the pedal mode indicates the driver is in control. Another mode could be a default mode for the remaining operating conditions such as normal part-pedal tip-ins and tip-outs. The result is a final arbitrated mode gain.

The final manifold filling lag adder, Step 110, is the base lag adder multiplied by the lag error gain and the arbitrated mode gain. The total airflow adder to be used to schedule throttle flow is the sum of the final lag adder and the final disturbance adder. The total airflow adder is then added to the original driver desired cylinder flow request to result in the final total requested throttle flow to schedule.

The final compensator from Step 110 is then summed with the original desired cylinder flow request form Step 100, at Step 134. The result is a value representing the total desired intake manifold inlet airflow (Step 136) to be communicated to normal electronic throttle scheduling methods. These methods typically utilize orifice flow equations, can then be used schedule the throttle given the total-air-flow request (step 136) and the prediction of MAP at the current conditions (Step 138). The result should be a precise scheduling of the throttle, or other manifold inlet flow control devices, such that the actual cylinder air-flow closely matches the target cylinder flow regardless of the changes in target cylinder flow or devices effecting volumetric efficiency.

The remainder of the steps are supporting functions required to create a model of the intake system and predict several estimations of operating states regarding manifold pressure, throttle or inlet flow, and cylinder flow. The example given within is for an engine with a throttle, but could be equally applicable to other inlet device combinations.

As noted, the following estimates are based solely on a model, and do not directly use sensor feedback to measure throttle angle or flow. The last total desired throttle flow from the output of Step 134 from the last iteration loop, which includes the addition of transient compensation from the last loop and subtracts modeled leakage flows from the last processing loop, is converted to a desired throttle angle in Step 112. This desired angle is calculated via a modified orifice flow equation and utilizes pressure ratio information from an estimate of barometric pressure and the predicted manifold pressure from the previous execution loop (Step 128). An example of this type of calculation can be found in U.S. Pat. No. 6,851,304 Cullen et al, and U.S. Pat. No. 5,526,787 inventor Pallet which are assigned to the assignee of this invention and are incorporated herein by reference.

Next, this desired throttle angle from Step 112 is then converted to a predicted estimate of current throttle angle in Steps 124 and 116. One model that can be used is a $1^{st}$ order filter (Step 124), such as a rolling average, in conjunction with a pure delay via a buffer or numerical method such as a Pade approximation (Step 116). In addition to a predicted throttle angle including a delay, a throttle angle prediction of the hardware with no delay present is also sent to Step 118 for eventual usage in the lag compensation calculation several steps later (Step 104).

The predicted throttle angle (TA) is then put back through an inverse (Step 120) of the orifice flow equation, used in Step 112 earlier, to calculate a predicted current throttle airflow. Additionally the non-delayed predicted throttle angle, from Step 114 is also run through an inverse orifice throttle flow equation (Step 118) to calculate a predicted throttle flow without mechanical or electrical delay for control purposes.

The predicted throttle air-flow from Step 120 is run through a standard manifold filling equation, Step 124, which uses a manifold filter constant which is a function of manifold physical parameters such as volume and volumetric efficiency information stored in the ECU as mentioned in methods earlier in this document. An example takes the form of New cylinder flow=(1−FK)(FK/FK last)(last cylinder flow)+(FK)(throttle air-flow), where FK is the filter constant of the manifold representing the natural time constant of the manifold filling lag at current operating conditions converted to a per processing loop step (either variable as in cylinder event resolved or a fixed rate such as 16 ms or 50 ms). This time constant or resulting filter constant can either be directly measured and stored in the ECU via experimentation or via physical regression information such coefficients relating inferred manifold pressure to cylinder charge flow. The output of Step 124 is a prediction of the current cylinder airflow. The predicted throttle airflow with no delay from Step 118 is also run through the same manifold filling equation in Step 122, and the result is a prediction of the current cylinder airflow if no throttle delay was present which feeds into the lag compensation via inverse manifold filling in Step 104. Alternatively, the invention herein could also be practiced substantially by excluding Steps 118 and 124, and feeding the output of Step 124 into Step 104 instead of from Step 122. However, by doing this, potential of the control algorithm to overshoot the desired cylinder flow at similar gains as if Steps 118 and 122 are present becomes larger as the physical delay modeled in Step 116 becomes larger in practice.

In Step 130, a disturbance compensation adder is calculated. This term is used to give a feed-forward compensation for manifold outlet flow devices which can directly change volumetric efficiency and thus manifold outlet flow directly. These devices may encompass variable cam or valve timing, switchable runner control, swirl control, tuning valves, internal dilution mechanisms, EGR plumbing directly into the intake runners, changes in engine speed, and changes in exhaust back pressure for some examples. The general format of the compensator in Step 130, is a differentiation of the Ideal Gas Law applied as a discrete partial differential solution in the change in manifold pressure with respect to time dimension. The partial derivative of manifold pressure is approximated by calculating the manifold pressure at the current engine operating conditions in Step 128, and then re-calculating manifold pressure where some of the engine operating conditions are the current conditions, and where the engine devices that will be compensated for provide their last operating conditions in Step 126. Additionally the manifold pressure estimate from Step 128 is also fed to Step 138 which is used in normal throttle or intake flow control device scheduling. Examples of intake flow control devices include: an electronic throttle; an air bypass or idle control valve; an electrically actuated valve-train; an electric pump or compressor; an electrically controlled variable mechanical compressor, as used in a supercharger or turbo-charger configuration; an electrically controlled variable mechanical compressor, as used in a supercharger or turbo-charger configuration.

The difference of these two manifold pressure values Step 130, which is derived from Steps 126 and 128, is then divided by the product of a portion of the Ideal Gas Equation [(R*T)/V] which we will call the manifold constant Km and the change in time from the last operating conditions and the current. With correct units, the result is the amount of airflow needed to be added at the inlet of the intake manifold to cancel out changes in cylinder flow due to the change in operating condition of the selected devices. The calculation of manifold pressure at both sets of conditions is enabled via an inferred manifold pressure algorithm. This can be of various types, such as those discussed earlier within this document. Then in Step 132 a gain multiplier can then be applied to increase or decrease the amount of compensation to either compensate for more than the exact airflow adder needed or less than the exact airflow adder needed. This would be used strictly for tuning capability, and is not a physical portion of the model.

Figure 4A:
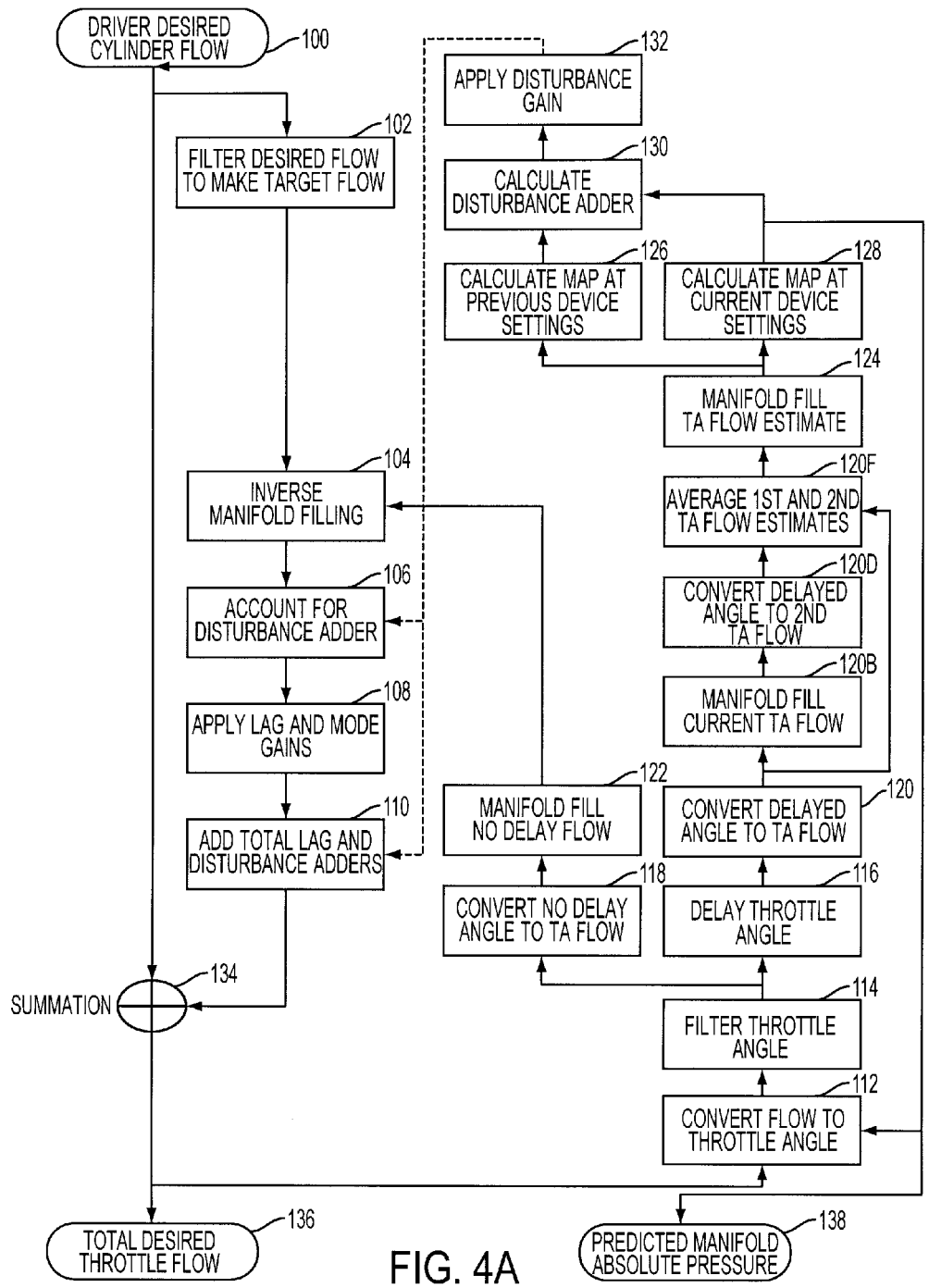
FIG. 4A is a detailed flowchart of modification of flowchart of FIG. 4 according to another embodiment of the invention.

Referring now to FIG. 4A, an alternative embodiment is shown. Here, instead of proceeding directly from Step 120 to Step 124, the process computes a first estimate of a cylinder flow via a manifold filling model. Then, in Step 120D, the process calculates a second estimate of throttle flow, which is an iteration on the results from Steps 120 and 120B. This second throttle flow (Step 120D) and the original throttle flow estimate from Step 120, are averaged together in Step 120F. The resulting average throttle flow from step 120F is then passed processed as described above in connection with FIG. 4, which encompasses a model of manifold filling in order to estimate an average cylinder flow over two iteration loops. The result of averaging over two iteration loops is faster and more accurate convergence to a numerical estimate of the throttle and cylinder flows. It can be noted that any number of iteration steps, repeating 120B, 120D, and 120F could be performed to further enhance convergence.

Other Methods of Compensating for Manifold Lag

While the best application of this invention uses inverse manifold filling as a one-shot calculation, two other methods of calculating a lag compensation term exist and were simultaneously invented and explored. They may have better application under various circumstances and may end up being advantageous under these conditions.

Method A

Closed Loop Control on Predictive Estimate of Cylinder Flow

Instead of inputting the current prediction of cylinder air-flow, with (Step 124) or without delay (Step 122), and target cylinder flow (Step 102) into an inverse manifold filling function (Step 104), you can input the error between the target flow and the predicted flow into one of many standard PID controllers. The Proportional (P), Integral (I), Derivative (D) controller can be used in place of Step 104, and acts to drive the error between the desired value of Step 104 and the estimate of actual value (Steps 122 or 124) to zero. This method gives traditional look and feel by tuning of P, I, and D terms, but does give up some feed-forward capability. Additionally, this method may also offer advantages if the manifold filling methods used in Steps 122 or 124 are not readily able to be inverted to a closed form solution.

Method B

Total Derivative of Predicted MAP

Where volumetric efficiency compensation is calculated today (Steps 126, 128, and 130), if both the change in device condition as well as the current and previous prediction of cylinder air charge is used to create current and previous predicted MAP, then both manifold filling and volumetric efficiency changes are compensated simultaneously. This method could be practiced by adding into Step 126 the previous estimate of cylinder air charge flow, which would be the value output by Step 124 but with a delay of one processing loop. The result is a partial derivative of manifold pressure in Step 130 that is in respect not only with manifold outlet flow device changes but also due to change in air charge. The entire lag compensation adder becomes irrelevant and redundant. The benefit of this method is simplicity and smaller code storage / chronometric load. The downside of this method is a high sensitivity to airflow request changes as everything is derivative based. Thus, the throttle compensation can be very jittery from execution loop to execution loop. Additional filtering can stabilize this, but does trade-off some performance and time synchronization of the compensation.

An example of this derivative method follows:

The compensation term (DELTAMAF) that would be created via Step 130 is calculated via two calculations of inferred manifold pressure, which now has the current and last predicted cylinder flows (desam_est_airchg and desam_est_airchg__1st). This output would eventually be summed with the original desired request in step 134.

DELTAMAF=[Inferred Manifold Pressure(estimated
  charge cylinder flow, cam position, . . . )–air inf
  map func(last estimated charge cylinder flow,
  last cam position . . . )]/
  (K_manifold*Delta_Time)

A number of embodiments of the invention have been described. Nevertheless, it will be understood that various modifications may be made without departing from the spirit and scope of the invention. For example, the desired inlet control device may be scheduled via a stored lookup rather than an orifice flow equation basis, other devices than a throttle may be employed to over an under-drive flow into the intake manifold, various steps may be present in some embodiments and not practiced in others, and various methods of calculating inferred manifold pressure and performing manifold filling functionality may be employed. Accordingly, other embodiments are within the scope of the following claims.

What is claimed is:

1. A method for determining airflow to a cylinder of an internal combustion engine, such airflow passing to the cylinder through an intake manifold, comprising:
providing a model of the intake manifold, such model providing a relationship between expected output airflow from the intake manifold in response to airflow into the intake manifold;
determining from the model the expected output airflow from the intake manifold from a previous commanded airflow into the intake manifold;
determining a compensation airflow required for the input airflow to the intake manifold to drive the expected output airflow from the intake manifold towards the desired cylinder airflow; and
providing such compensation airflow to the intake manifold.

2. The method recited in claim 1 wherein the model determination includes changes in volumetric efficiency of the intake manifold from changes in device states or engine operating states that effect cylinder flow or volumetric efficiency.

3. The method recited in claim 2 wherein the airflow compensation comprises using a differentiation of the Ideal Gas Law comprising a partial derivative of manifold pressure with respect to device states, divided by a product of: the Ideal Gas Constant, the reciprocal of the volume of the intake manifold, absolute gas temperature in the intake manifold, and the change in time over which the partial derivative being computed.

4. The method of claim 1 wherein the compensation is an airflow adder to be used via commands to an intake flow control device.

5. The method of claim 4 wherein the intake flow control device is an electronic throttle.

6. The method of claim 4 wherein the intake flow control device is an air bypass or idle control valve.

7. The method of claim 4 wherein the intake flow control device is an electrically actuated valve-train.

8. The method of claim 4 wherein the intake flow control device is an electric pump or compressor.

9. The method of claim 4 wherein the intake flow control device is an electrically controlled variable mechanical compressor, as used in a supercharger or turbo-charger configuration.

10. The method of claim 4 wherein the intake flow control device is an electrically controlled variable mechanical compressor, as used in a supercharger or turbo-charger configuration.

11. The method of claim 3 wherein the device state change is from a variable cam, which can be either intake, exhaust, or both.

12. The method of claim 3 wherein the device state change is from a variable valve timing mechanism, which can be either intake, exhaust, or both.

13. The method of claim 3 wherein the device state change is from a runner length control valve.

14. The method of claim 3 wherein the device state change is from a swirl control valve.

15. The method of claim 3 wherein the device state change is from a intake tuning valve.

16. The method of claim 3 wherein the device state change is from an internal dilution mechanism or external exhaust gas recirculation directly into the intake runners or ports.

17. The method of claim 3 wherein the device state change is from an exhaust device, such as a variable geometry turbocharger, where the exhaust back pressure changes rapidly with the device.

18. The method of claim 3 wherein the device state change is augmented with a change in estimated cylinder charge flow in the calculation of the partial derivative of manifold pressure.

19. The method recited in claim 1 including compensating for lags between the desired airflow and output airflow due to intake manifold filling dynamics.

20. The method of claim 19 wherein the compensation is an airflow adder used via commands to an intake flow control device.

21. The method of claim 19 wherein the compensation for manifold lags is a Proportional-Integral-Derivative control algorithm, which acts on the error between the target cylinder flow and an estimate of cylinder flow.

22. The method recited in claim 1 wherein the compensation includes modification of a gain term.

23. The method recited in claim 22 wherein the gain term is a function of whether a requested action of intake manifold pressure response is in a filling or un-filling regime.

24. The method recited in claim 22 wherein the gain term is a function an error between the desired airflow and the airflow provided by the model.

25. The method recited in claim 22 wherein the gain term is a function of a computer storable and readable value based on being in a managed tip-in mode from a negative driveline torque condition.

26. The method recited in claim 22 wherein the gain term is a function of a computer storable and readable value based on being in a cylinder deactivation or variable displacement condition.

27. The method recited in claim 22 wherein the gain term is a function of a computer storable and readable value based on being in an idle condition.

28. The method recited in claim 22 wherein the gain term is a function of a computer storable and readable value based on being in a manifold pressure bleed down or dashpot condition.

29. The method recited in claim 22 wherein the gain term is a function of a computer storable and readable value based in a non-idle closed loop engine speed control condition.

30. The method recited in claim 22 wherein the gain term is a function of a computer storable and readable value based on being in a low vehicle speed or launch condition.

31. The method recited in claim 22 wherein the gain term is a function of a computer storable and readable value based on being in a torque reduction condition.

32. The method recited in claim 31 wherein the torque reduction condition is due to either engine speed or vehicle speed limiting.

33. The method recited in claim 31 wherein the torque reduction condition is due to transmission shift requirements or truncation of torque to protect the transmission from damage.

34. The method recited in claim 31 wherein the torque reduction condition is due to an active chassis control algorithm such as traction control or roll stability control.

35. The method recited in claim 1 wherein the compensation determination comprises using an inverse intake manifold filling model.

36. The method recited in claim 35 wherein the model is in the form of throttle flow compensation adder=[(1−FK)/(FK)]*Target Cylinder Flow−[(1−FK)/(FKlast)]* Prediction of Cylinder flow without throttle delay, where FK is a manifold filling filter constant.

37. The method recited in claim 36 including determining a symbiotic merger of a manifold filling lag compensator and a manifold outlet device compensator.

38. The method recited in claim 37 including determining a lag adder to allow for a dead-band and reduced gain at lower airflow errors.

39. The method recited in claim 37 wherein the gain is a multiplier that varies as a function of airflow error and target cylinder flow.

40. The method recited in claim 37 wherein the gain is a function of the direction of the target cylinder flow.

41. The method recited in claim 37 wherein the gain varies as a function of operating mode.

42. The method recited in claim 41 including a second gain, such second gain being a function of operating mode.

43. The method recited in claim 38 including providing transient compensation comprising leakage flow compensation.

44. The method recited in claim 1 including:
predicting expected throttle position;
calculating a desired intake flow control device position for the throttle; and
approximating the intake control device position response via a first or second order low pass filter in series with a pure delay.

45. The method recited in claim 1 including:
predicting throttle flow from a prediction of current throttle position and a prediction of current pressure ratio across the throttle from an estimate of barometric pressure and estimated current manifold absolute pressure within an orifice flow equation.

46. The method recited in claim 1 including estimating manifold pressure using a manifold filling dynamics model and feed the estimated manifold pressure into an inferred manifold pressure algorithm.

47. The method recited in claim 1 wherein the compensation determination includes compensating for lag between an intake flow control device based requested cylinder flow and delivered cylinder flow, via a model of intake manifold filling dynamics.

48. The method recited in claim 1 wherein the compensation determination includes using an air flow adder to command an intake flow control device.

49. The method recited in claim 1 wherein the compensation determination includes determining an inversion of a model of manifold filling.

50. The method recited in claim 49 wherein the compensation determination comprises using a Proportional-Integral-Derivative control algorithm.

51. The method recited in claim 1 wherein the compensation determination includes determining the partial derivative of manifold absolute pressure with respect to a device state change and with respect to a change in estimated cylinder charge flow in the calculation of the partial derivative of manifold pressure.

* * * * *